Figure 1:
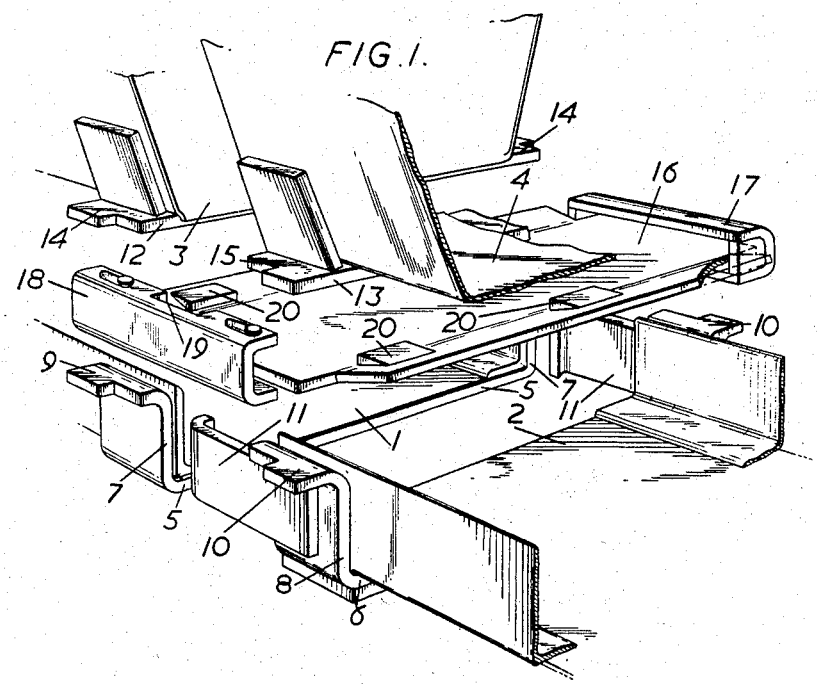

Jan. 20, 1959  A. W. DUNCAN  2,869,713
SCRAPER CHAIN CONVEYOR STRUCTURES
Filed Nov. 1, 1954  2 Sheets-Sheet 1

Inventor
ANGUS W. DUNCAN
By

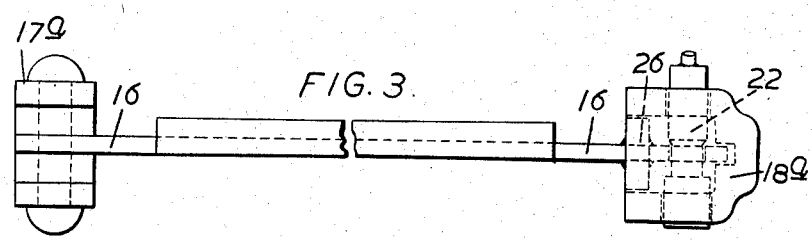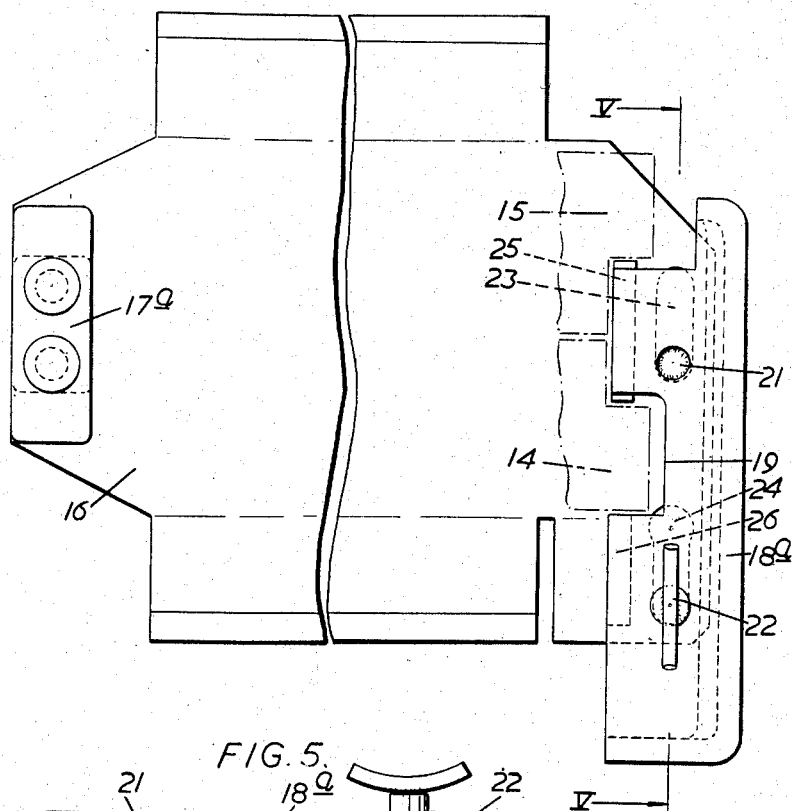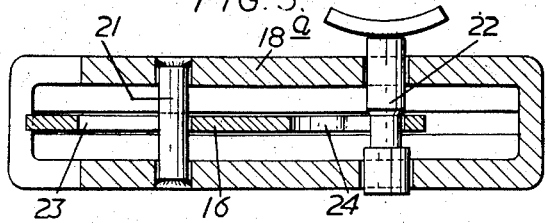

United States Patent Office 2,869,713
Patented Jan. 20, 1959

2,869,713

SCRAPER CHAIN CONVEYOR STRUCTURES

Angus W. Duncan, Worcester, England, assignor to The Mining Engineering Company Limited, Worcester, England Application November 1, 1954, Serial No. 466,147

Claims priority, application Great Britain November 2, 1953

4 Claims. (Cl. 198—204)

This invention relates to scraper chain conveyor structures of the kind made up from series of separable upper and lower trough sections which are locked together end to end.

There have been proposals to provide locking means carried by one or other trough section at each joint to engage lugs or the like fixed to each of the other three troughs and to hold them assembled.

An important feature of such structures is that any trough in the assembled conveyor may be removed without disturbing the rest of the conveyor and, with the known types of connection, this necessitates the use of a butt joint between the upper troughs. In practice, it has been found that a considerable quantity of fines from the material being conveyed falls through these joints into the lower troughs, causing difficulty in the working of the conveyor.

The object of this invention is to provide a scraper chain conveyor structure having upper and lower troughs retaining the ability to remove any trough in the conveyor run but having closure means for the joint between upper troughs which forms a seal for the butt joint between adjacent troughs.

According to the invention in its broadest aspect a structure for scraper chain conveyors of the kind made up from series of separable upper and lower trough sections which can be locked together end to end has the upper trough sections at least butting together and independent plates extending transversely across the tops of the lower troughs under the joints between the upper troughs to form spillage seals.

According to the invention from another aspect, a scraper chain conveyor structure of the kind referred to is provided with independent members to interconnect adjacent upper troughs and lower troughs together and lock them against longitudinal and vertical separation, the said independent members extending transversely across the conveyor structure and sealing the joints between adjacent pairs of upper troughs.

In preferred structures the independent member carries at its outer ends two inwardly facing channels or the like to provide upper and lower pockets for the reception of lugs protruding transversely and outwardly from each of the troughs, at least one of the channels or the like being notched and movable to permit entry of the lugs through the notches therein into the pockets by relative vertical movement in an "unlocked" position and movable to prevent such relative vertical movement in a "locked" position.

The lower troughs may have stiffening straps fixed beneath them at both ends and extending upwardly and outwardly to provide their fixing lugs. Each lower trough may also be provided with a hook or slot member arranged to engage a complementary member on the end of an adjacent trough. There may be such member at both sides of one end of each lower trough or one such member at diagonally opposite end corners of each trough.

The upper troughs may be provided with stiffening straps fixed beneath them at their ends and extended outwards to furnish their fixing lugs.

The independent connecting member may be a shallow troughed pressing and may include stop pieces to engage transversely extending faces of the stiffening straps or other part of the upper and/or lower troughs and hold them against longitudinal separation.

All the lugs projecting from the troughs are preferably notched or cut away over approximately half their width to enable a comparatively short overall movement of the movable channels to encompass both "locked" and "unlocked" positions.

Where only one of the channels at one side of the connecting member is movable, the channel at the opposite side may be closed at its ends so that the upper and lower pockets at that side assist in preventing longitudinal separation of the troughs.

The upper troughs may be made in two or more longitudinally divided pieces.

Figure 2:
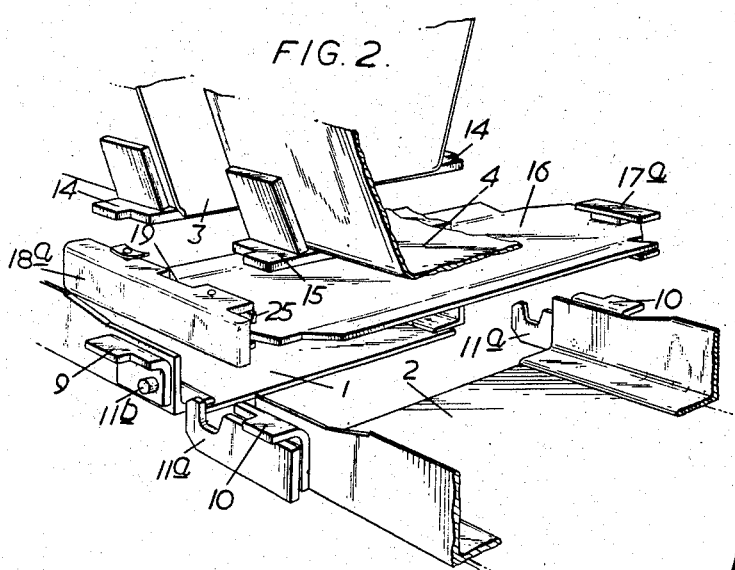

The above and other parts of the invention are embodied in one or other of two preferred forms of scraper chain conveyor structure which will now be described in some detail by way of example with reference to the accompanying drawings in which Fig. 1 is an exploded perspective view (with parts cut away) of the adjacent ends of troughs to be connected end to end and their connecting means. Fig. 2 is an exploded perspective view (with parts cut away) of a modified arrangement of adjacent trough ends to be connected and their connecting means. Fig. 3 is a vertical section through an independent plate constituting connecting means and shown in perspective in Fig. 2. Fig. 4 is a plan view of the plate shown in Fig. 3. Fig. 5 is a section on the line V—V of Fig. 4.

As far as possible similar references are used to denote similar parts in all the figures.

The conveyor structure shown in Fig. 1 is built up from the lower troughs 1 and 2 and upper troughs 3 and 4 aligned with each other in two rows. The ends of adjacent troughs in each row abut and have to be locked against both longitudinal and vertical separation.

The lower troughs have end straps 5 and 6 including vertical portions 7 and 8 round each end with the ends projecting laterally to form lugs 9 and 10 and notched so that the inner edge projection is the longer. To the vertical portion of the end strap 8 at one end of the trough 2 are attached longitudinally projecting hook members 11 to receive the vertical portion 7 of the end strap 5 of the mating lower trough 1 and thus hold the lower troughs 1 and 2 in approximate longitudinal relationship during assembly and in accurate lateral relationship.

The upper troughs 3 and 4, which may be of one or more piece construction, have lateral straps 12 and 13 at each end attached to their undersides, the ends projecting to form lugs 14 and 15 and being notched to correspond to the end straps of the lower troughs 1 and 2.

An independent connecting member 16 is a shallow trough pressing extending laterally across the lower troughs and having at one end a U-shaped pressing or forging 17 with closed ends, the open face of the U being inwards.

At the other end is slidably mounted a U-pressing or forging 18 with the open face of the U inwards, and the legs of the U notched as at 19 to admit the notched end of one of the trough lugs 14 of each adjacent trough in the open position while the other notched lugs 15 passes the end of the U member. Both U members have a leg above and a leg below the web of the trough member. Stop pieces 20 fixed to the upper face of the trough member 16 are spaced so as to receive the cross straps 12 and 13 of the two upper troughs 3 and 4 with working clearance and hold them against longitudinal separation.

To assemble the structure, the lower troughs 1 and 2 are brought together and the vertical parts 7 of the straps 5 of alternate troughs 1 are dropped inside the projecting hook members 11 of their mating troughs 2. The lower scraper chain flight is then put in place. The connecting members 16 are fitted across the joints of the lower troughs, the lower leg of the fixed U-members 17 being slid laterally under the lugs 9 and 10 of the lower troughs on one side, and the lower legs of the sliding U-members 18 passing the lugs 9 and 10 on the other side through the notched gaps. The upper troughs 3 and 4 are fitted by sliding the projecting strap lugs 14 and 15 on one side into the fixed U-members 17 and lowering the projecting lugs 14 on the other side past the U-member through the notched gaps 19. The U-members 18 on this side are then moved longitudinally so that the longer parts of the legs come above and below the longer parts of the projecting lugs 14, 15, 9 and 10 on both the upper and lower troughs.

It will be understood that the troughs are now locked in longitudinal and vertical relationship and the butt joint between the upper troughs 3 and 4 is sealed by the channel transverse member 16.

The sliding U-member may be locked in the closed position by known means. The upper strand of the scraper chain is then laid in the upper trough.

To remove an upper trough anywhere in the conveyor run the two appropriate sliding U-members 18 are moved to the open position when the upper trough can be tilted slightly and withdrawn transversely from the fixed members 17.

It will be appreciated that the transverse member 16 carrying the connections 17 and 18 can be fitted to the troughs with the sliding connecting member 18 on either side of the conveyor as may be convenient.

If required by the method of working, sliding connecting members 18 may be used at both ends of the transverse member.

In a modification of the structure above described illustrated in Figs. 2 to 5 of the drawings like reference denote like references where possible.

It will be seen that the hook members 11 on the troughs 2 are replaced by slotted members 11ª and that these members engage pins 11ᵇ carried by the troughs 1.

It will also be apparent from Figs. 2, 3 and 4 that the pressing or forging 17 is replaced by a riveted structure 17ª, which presents open sided slots or pockets for the reception of the lugs 9, 10, 14 and 15 of the two troughs 1 and 2 on that side of the structure.

The sliding member 18ª is also somewhat modified from the sliding U member of Fig. 1.

The member 18ª is a casting notched at 19 to permit (when in its open position) passage of the lug 14 and similarly notched in its lower web to permit passage of the lug 9.

A riveted pin 21 and a loose pin 22 slide in a straight sided slot 23 and a keyhole slot 24 respectively. These slots are formed in the plate 16.

The loose pin 22 is shown in Fig. 5 with a portion of reduced diameter registering in the narrow part of the keyhole slot 24. When the member 18ª is shifted to the left (the locking position) the larger diameter portion of the pin 22 falls into register with the arcuate part of the slot 24 and prevents the member 18ª from being shifted back to right until the pin is lifted to bring its narrow portion back into register with the slot.

Two inner guide plates 25 and 26 welded through slots in the plate 16 not only serve to guide the inner surface of the member 18ª, but also act as longitudinal location means for the lugs 9, 10, 14 and 15. The position occupied by the lugs 14 and 15 is indicated in dotted lines in Fig. 4 which shows the member 18ª in the open position.

It will be seen that the lug 14 is positively fixed against longitudinal movement relative to the plate 16. The lugs 15 could be shifted outwards from the guide plate 25, but it will be positively located as soon as a further trough is fixed to the far end of trough 4.

The lugs 9 and 10 are not only located by the slot and pin connection 11ª, 11ᵇ but also by their location between guide plates 25 and 26.

The assembly and operation of the modified structure of Figs. 2 to 5 is carried out just as described above with reference to the structure of Fig. 1.

I claim:

1. A locking member for a scraper chain conveyor structure including a series of upper and lower trough sections having projecting locking lugs at each end and adapted to be locked together with said sections end to end, comprising an independent member in the form of a plate formed to overlie the joint between an adjacent pair of lower trough sections and underlie the joint between an adjacent pair of upper trough sections to form a seal beneath said latter joint, the said independent member being provided at each end with locking means for embracing said lugs of adjacent trough sections and by which the said upper sections are locked to said lower sections and to each other.

2. A locking member as claimed in claim 1 wherein said locking means comprise at least one fixed pocket element located at one of its ends and at least one longitudinally movable member including a pocket at the other of its ends.

3. A locking member according to claim 2 wherein said movable member is provided with means to lock it in longitudinally shifted position.

4. A locking member according to claim 1, adapted for use with trough sections which have cut-away portions on transverse straps projecting transversely from their sides, wherein the locking means comprise longitudinally movable members including pocket elements with cut-away sections registrable with the strap portions, and means to lock the members in longitudinally shifted position.

References Cited in the file of this patent

FOREIGN PATENTS

| 828,438 | France | Feb. 14, 1938 |
| 674,797 | Germany | Apr. 22, 1939 |
| 498,316 | Belgium | Oct. 14, 1950 |